United States Patent [19]

Schulz et al.

[11] 4,143,100
[45] Mar. 6, 1979

[54] GRAFT COPOLYMERS CONTAINING POLYOXAZOLINE AND POLYOXAZINE, AND THE PREPARATION THEREOF

[75] Inventors: Donald N. Schulz, Hartville; Prakash D. Trivedi, Akron, both of Ohio

[73] Assignee: The Firestone Tire & Rubber Company, Akron, Ohio

[21] Appl. No.: 796,911

[22] Filed: May 16, 1977

[51] Int. Cl.² ............... C08G 259/04; C08G 253/00
[52] U.S. Cl. ........................ 260/899; 260/3.3; 260/889; 260/890
[58] Field of Search .............. 260/899, 857 G; 526/50

[56] References Cited

U.S. PATENT DOCUMENTS

| 2,554,959 | 5/1951 | Rowland | 526/50 |
| 3,281,310 | 10/1966 | Danielson | 260/879 |
| 3,470,267 | 9/1969 | Litt et al. | 260/899 |
| 3,928,501 | 12/1975 | Vandenberg | 260/899 |
| 4,001,147 | 1/1977 | Chamberlain et al. | 260/874 |
| 4,011,376 | 3/1977 | Tomalia et al. | 526/11.1 |

OTHER PUBLICATIONS

Saegusa et al., Macromolecules, vol. 8, No. 4, Jul.-Aug., 1975 pp. 390–395.
Saegusa, Macromolecules, vol. 6, No. 6, Nov.-Dec., 1973 pp. 805–808.

Primary Examiner—John C. Bleutge

[57] ABSTRACT

The graft copolymer is the reaction of a backbone polymer having allylic chloride groups therein and monomers forming a pendant graft polymer in the presence of a coinitiator. The monomers have the formula

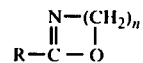

wherein R is an alkyl group having from 1 to 15 carbon atoms, a cycloalkyl group having from 4 to 15 carbon atoms, an aryl group having from 6 to 15 carbon atoms, combinations thereof, or hydrogen. The amount of the pendant graft polymer portion by weight ranges from about 0.5 percent to about 90 percent based upon the total weight of the total graft copolymer with the pendant graft polymer being substituted on the polymer backbone in lieu of the chlorine atom of the allylic chloride group. The backbone polymer is selected from the class consisting of poly(vinyl chloride), polychloroprene, and unsaturated elastomers, the unsaturated elastomers being selected from the class consisting of chlorinated polydienes having repeating units containing from 4 to 12 carbon atoms, polychloroprene, chlorinated butyl rubber, chlorinated EPDM, chlorinated natural rubber, chlorinated styrenebutadiene rubber, and blends thereof.

17 Claims, No Drawings

GRAFT COPOLYMERS CONTAINING POLYOXAZOLINE AND POLYOXAZINE, AND THE PREPARATION THEREOF

BACKGROUND OF THE INVENTION

The present invention relates to a new class of pendant graft copolymers made from a backbone containing allylic groups and specific heterocyclic monomers.

Considering the graft copolymers, U.S. Pat. No. 3,281,310 to Danielson merely relates to the improved adhesion of rubber articles to textiles through the incorporation of the rubber compound of an Ingredient A which may include oxazine or oxazoline among other compounds with an Ingredient B which may be resorcinol or other meta-disubstituted benzene compounds. Only very small amounts of any oxazine compound is added and the improved adhesion occurs through the reacton of the Ingredient A with polar groups such as those contained in the Ingredient B-type compound. Moreover, nowhere is there even suggested the existence of an initial backbone containing allylic chloride groups.

In an article published in the magazine MACROMOLECULES, Volume 6, No. 6, November-December, 1973, Pages 805-808, Saegusa describes the preparation of an ABA-type block copolymer prepared from 2-oxazoline and hydroxyl terminated polybutadiene. However, the polybutadiene backbone completely lacks any initial allylic chloride groups and the route of preparation is through tosylation of the hydroxyl terminated polybutadiene end groups utilizing tosyl chloride. Polymeriztion is then conducted primarily in a solvent of toluene and DMF with the insoluble block copolymer precipitating out.

In another article by Saegusa appearing in MACROMOLECULES, Volume 8, No. 4, July-August, 1975, Pges 390-395, a graft copolymer is prepared. However, the graft contains a polystyrene backbone with, of course, the styrene groups being pendant from the ethylene-type backbone. Some of the pendant styrene groups contain chloromethyl groups thereon. Monomers of 2-methyl-2-oxazoline are utilized and form pendant polymers by reaction with the chloromethylated groups on the polystyrene. Cross-linked as well as non-cross-linked macroporous bead polymers are formed. The graft polymer, of course, does not contain any initial allylic chloride groups in the backbone, does not contain any unsaturation in the backbone, and utilizes potassium iodide as a coinitiator in lieu of applicants' various metal salts. Moreover, applicants' pendant polymers are connected directly to the backbone and not to any pendant benzyl groups.

U.S. Pat. No. 4,001,147 to Chamberlain et al, relates to the graft copolymers obtained by reacting oxazoline or oxazine with a cross-linked vinyl aromatic polymer bearing pendant halomethyl groups on the aromatic rings. Macroporous beads prepared in such a manner are particularly useful in removing phenolics from aqueous waste streams and the like. These graft copolymers are similar to Saegusa in that they have merely an ethylene-type backbone, completely lack any initial backbone sites of allylic chloride, and formation of the pendant graft polymers is off of the pendant benzyl groups.

U.S. Pat. No. 4,011,376 to Tomalia describes the preparation of olefin terminated oxazoline homopolymers through the use of allyl chloride or preferably vinyl benzyl chloride and optionally, with sodium iodide as a coinitiator. No teaching or suggestion of the formation of a copolymer is mentioned. Additionally, any further polymerization would require further reaction through the olefin (vinyl) unit to form a copolymer. The Tomalia invention does not utilize allyl chlorinated polymers as initiators for copolymerization or Group 1b salts (e.g. AgSo₃CF₃) as coinitiators. Hence, it is not pertinent.

SUMMARY OF THE INVENTION

It is therefore an object of the present invention to provide graft copolymers made from a backbone polymer containing allylic chloride sites therein and pendant polymer chains made from heterocyclic monomers.

It is an additional object of the present invention to provide the above graft copolymers wherein the heterocyclic monomers have the formula

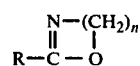

wherein n is 2 or 3 and R is an allyl, a cycloalkyl, an aryl group, combinations thereof, or hydrogen.

It is a further object of the present invention to provide a graft copolymer made from the above heterocyclic monomers utilizing metal salts is coinitiators.

It is yet another object of the present invention to provide graft copolymers, as above, which may be solvent and oil-resistant, thermoplastic, or flexible.

Generally, a graft copolymer composition, comprises the reaction product of a backbone polymer having allylic chloride groups therein and monomers forming a pendant graft copolymer, said monomers having the formula

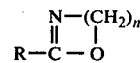

wherein R is an alkyl group having from 1 to 15 carbon atoms, a cycloalkyl group having from 4 to 15 carbon atoms, an aryl group having from 6 to 15 carbon atoms, combinations thereof, or hydrogen, and wherein n is 2 or 3, the amount of weight of said pendant graft copolymer ranging from about 0.5 percent to about 90 percent based upon the total weight of said graft copolymer, said backbone polymer selected from the class consisting of poly(vinyl chloride) having allylic chloride groups therein, unsaturated elastomers having allylic chloride groups therein and polychloroprene, said unsaturated elastomers selected from the class consisting of chlorinated polydienes having the repeating units containing from 4 to 12 carbon atoms, chlorinated butyl rubber chlorinated EPDM, chlorinated natural rubber, chlorinated styrene-butadiene rubber, and blends thereof, said graft copolymer substituted for said chlorine atom of said allylic chloride group of said backbone polymer.

The graft copolymers set forth immediately above are generally prepared according to a process by heating said backbone polymer and said heterocyclic monomers at a temperature of from about 50° C to about 150° C, preferably, in the presence of a metal salt coinitiator.

PREFERRED EMBODIMENTS OF THE DISCLOSURE

The heterocyclic monomers which are utilized to form the pendant polymer portions of the graft copolymers of the present invention have the formula

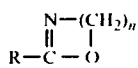

wherein R is an alkyl group having from 1 to 15 carbon atoms, a cycloalkyl group having from 4 to 15 carbon atoms, an aryl group having from 6 to 15 carbon atoms, combinations thereof, or hydrogen, and wherein n is 2 or 3. Specific examples of various R groups include methyl, ethyl, propyl, butyl, etc., cyclobutyl, cyclopentyl, etc., phenyl, benzyl, and the like. A highly preferred group is methyl. Thus, the preferred heterocyclic compounds of the present invention are 2-methyloxazoline where n is 2 and 2-methyloxazine where n is 3. It is an important aspect of the present invention that the heterocyclic monomers contain exactly the structure as set forth above, that is, a five or six ring system containing one nitrogen atom and one oxygen atom with one point of unsaturation between the nitrogen and carbon atom as shown. Otherwise, a completely different product results.

The graft copolymer contains a backbone having allylic chloride groups therein. The backbone may be poly(vinyl chloride), polychloroprene, or an allyl chlorinated elastomer. Generally, the poly(vinyl chloride) will naturally contain a small amount of allylic chloride groups therein, that is, about 1 to 2 percent by weight. If not, allylic chloride groups may be added in any conventional manner well known to those skilled in the art. Generally, the amount of allylic chloride groups by weight in the backbone polymer range from about 0.1 to about 40 percent based upon the total weight of the backbone with a desirable range being from about 0.1 percent to about 5 percent by weight. A preferred range extends from about 0.3 percent to about 3 percent.

The elastomers may be prepared in any conventional manner and if they do not naturally contain allylic chloride groups, they may also be chlorinated in any conventional manner, for example, through the use of t-butylhypochlorite and light. The elastomers which can constitute the backbone polymer of the present invention are chlorinated polydienes having from 4 to 12 carbon atoms in the repeating unit, chlorinated butyl rubber, that is a chlorinated copolymer of isobutylene and a diene commonly such as isoprene, butadiene, and the like, chlorinated EPDM (ethylene-propylene diene monomer), chlorinated natural rubber, and the chlorinated copolymer of styrene and butadiene wherein the unsaturated butadiene repeating unit has been chlorinated. Examples of specific polydienes, that is, polymers made from conjugated dienes having from 4 to 12 carbon atoms, include polybutadiene, polyisoprene, poly(2,3-dimethylbutadiene), and the like. The EPDM polymers contain diene repeating units, as well known to those skilled in the art, such as butadiene, dicyclopentadiene, ethylene norborene, or 1,4-hexadiene, and the like. Polychloropropene, that is poly(2-chloro-1,3-butadiene), and copolymers thereof which are well known to those skilled in the art, naturally contain allylic chloride groups and, thus, need not be further chlorinated.

Preferred unsaturated backbone polymers containing allylic chloride groups therein are polychloroprene, chlorinated natural rubber, chlorinated polybutadiene, chlorinated polyisoprene, and the chlorinated copolymer of styrene and butadiene.

The number average molecular weight of the backbone polymer ranges from about 500 to about 500,000 when the polymer is poly(vinyl chloride) and preferably from about 20,000 to about 150,000. The elastomer and the polychloroprene backbone will have a number average molecular weight range of from about 500 to about 2,000,000 with a preferred range extending from about 20,000 to about 200,000. The number average molecular weight of the graft copolymer will vary over a very wide range such as from about 700 to about 4,000,000 with a preferred range being from about 20,000 to about 2,000,000.

During the polymerization of the heterocyclic compound, the ring is opened at the point between the oxygen atom and its adjacent — $CH_2$ group with the said nitrogen atom being substituted for the chlorine atom of the allylic chloride group of the backbone polymer. Thus, the pendant graft polymers formed such as the preferred pendant polymers of poly(methyloxazoline) and poly(methyloxazine) are directly attached to the backbone polymer chain, and not to any intermediate compounds or groups. This is true also with regard to the situation wherein the backbone polymer is a copolymer of butadiene and styrene since the pendant polymer is attached to the butadiene portion of the chain and not to the pendant styrene portion. The amount of the pendant heterocyclic compound by weight based upon the total the graft copolymer ranges from about 0.5 percent to about 90 percent. When the backbone polymer is polychloroprene or an unsaturated chlorinated elastomer, a preferred range extends from about 8 percent to about 40 percent by weight. When the backbone polymer is poly(vinyl chloride), the weight percent of the pendant polymers made from the heterocyclic monomers preferably ranges from about 2 percent to about 70 percent.

Basically, the formation of the graft copolymer involves the reaction of the backbone polymer containing allylic chloride groups as an initiator and a heterocyclic monomer, followed by a cationic polymerization of the heterocyclic monomers in a suitable vessel, desirably with a coinitiator, and the application of heat to the vessel. The polymerization temperature ranges from about 50° C to about 150° with a preferred range being from about 80° C to bout 150° C. As noted, the primary initiator of the cationic polymerization is the allyl chlorinated backbone polymer and the amount of such polymer required ranges from about 0.5 to about 200 per 100 parts by weight of the heterocyclic monomers with a preferred amount ranging from about 10 parts to about 50 parts. It is important in the present invention in the preparation of the graft copolymer to generally use a metal salt coinitiator unless a polar solvent is utilized. The metal portion of the coinitiator may be a Group $1a$ metal, desirably sodium or potassium, or preferably a Group $1b$ metal, desirably copper or silver. The anion portion of the metal salt may be $CF_3SO_3^-$, $PF_6^-$, $ClO_4^-$, $BF_4^-$, $SbCl_6^-$, $SbF_6^-$, and $AsF_6^-$. A highly preferred coinitiator is $AgSO_3CF_3$, commonly known as silver triflate. The amount of the coinitiator may range from about 0.2 millimoles to about 10.0 millimoles with a range of from about 0.4 to about 3.0 millimoles being preferred.

The pressure conditions of the polymerization are generally atmospheric although higher or lower pressures may be utilized. The actual polymerization atmosphere is an inert gas such as nitrogen, helium, or argon.

In the formation of the graft copolymer it is desirable to carry out the direct substitution of the heterocyclic monomers on the backbone polymer as well as the polymerization of the heterocyclic monomers in bulk or in a medium which generally acts as a solvent. Usually, solvents with a low polarity are desired. Specific examples include a mixture of toluene and DMF (dimethylformamide), methylene chloride, and the like. The copolymer may be precipitated by using various nonsolvents such as methanol or methanol-ether mixtures.

Generally, when a polymerization is carried out in bulk, the grafting efficiency, that is the amount of monomer grafted versus the total amount of monomer converted, is very high.

The reaction product of the backbone polymer and the heterocyclic monomers, that is the graft copolymer, is generally a good solvent or oil-resistant elastomer and may be utilized in desirable applications such as "O" rings, fuel seals, and the like. Additionally, thermoplastic elastomers are also formed and may be utilized in shoe soles, adhesives, as well as for various automotive parts. When the graft copolymer has poly(vinyl chloride) as a backbone, the solubility and flexibility may be generally varied according to the grafted polymer and, thus, uses include those of flexible to rigid PVC sheets.

The invention will be better understood by reference to the following examples.

EXAMPLE I

PVC BACKBONE — BULK POLYMERIZATION

Fifteen grams of poly(vinyl chloride) (F.P.C. 9300 manufactured by Firestone Plastics Co., having an allylic chloride content of approximately 0.5 to 3 percent by weight, and a relative viscosity of 0.96, ASTM-D-1243-66) was dissolved in 200 milliliters of 2-methyloxazoline. Two milliliters of DMF containing a few dissolved KI crystals (approximately 0.5 grams, 3.0 millimoles) were added to the solution. The bottle was agitated and kept at 80° C for 160 hours. The polymer was taken out and given a thorough washing with methyl alcohol to remove any homopolymer of 2-methyloxazoline. The pendant graft polymer constituted 61 percent by weight of a graft copolymer. The total monomer conversion was 17 percent and the grafting efficiency was 69 percent as calculated by weight.

The dried graft copolymer was milled and molded and gave a brittle rigid poly(vinyl chloride)-like product.

EXAMPLE II

PVC BACKBONE — BULK POLYMERIZATION

Fifteen grams of PVC (F.P.C. 9300) was dissolved in 200 milliliters of 2-methyloxazoline containing 5 milliliters of DMF in which two crystals of KI (approximately 0.25 grams, 1.5 millimoles) were dissolved. The mixture was continuously agitated at 80° C in a sealed bottle for 120 hours. On precipitation of the graft product in excess methanol and subsequent filtration and drying, 34 grams of a graft copolymer was recovered. Thus, it contained 55.9 percent of poly(2-methyloxazoline). Next, 4.3 grams of a homo poly(2-methyloxazoline) was obtained from a methanol solution upon evaporation of the solvent. The grafting efficiency was 81.5 percent and the monomer conversion was 11.7 percent.

In a control reaction, 15 grams of PVC was dissolved in 200 milliliters of 2-methyloxazoline and the reaction was carried out at 80° C for 168 hours, in absence of any coinitiator. The recovered PVC showed no increase in weight indicating absence of grafting.

EXAMPLE III

PVC BACKBONE — BULK POLYMERIZATION

Four bottles, each containing 15 grams of PVC (F.P.C. 9300), 200 milliliters of 2-methyloxazoline, and 3 milliliters of 0.13 moles of $AgSO_3CF_3$ solution (.39 millimoles) in THF, were kept agitated in an 80° C bath. The reactions were continued for different time intervals and products were precipitated in excess methanol, filtered and dried. The homo poly(2-methyloxazoline) was recovered by evaporizing the methanol solution. The following results were obtained.

TABLE I

| NO. | TIME HRS. | GRAFT GRAMS | POLY(2-METHYL-OXAZOLINE) IN GRAFT % WEIGHT | HOMO POLY(2-METHYL-OXAZOLINE)- GRAMS | GRAFTING EFFICIENCY % | 2-METHYLOXAZOLINE CONVERSION, % |
|---|---|---|---|---|---|---|
| 1 | 15 | 17.8 | 15.7 | 2.45 | 53.8 | 2.6 |
| 2 | 20 | 19.2 | 21.9 | 1.94 | 68.8 | 3.1 |
| 3 | 39 | 27.2 | 44.9 | 0.80 | 93.8 | 6.5 |
| 4 | 47 | 31.0 | 51.6 | 3.40 | 82.5 | 9.7 |

EXAMPLE IV

PVC BACKBONE — SOLUTION POLYMERIZATION

Twenty grams of PVC (F.P.C. 9300) was dissolved in 600 milliliters of $CH_2Cl_2$ and 55 milliliters of 2-methyloxazoline was added. The solution was agitated in a sealed bottle under nitrogen at 80° C for 109 hours. The polymer was dropwise precipitated in excess methanol, filtered and dried at 60° C in a vacuum oven. The weight of the graft product was 23 grams. Homo poly(2-methyloxazoline) in the amount of 22.7 grams was recovered from the methanol solution by evaporating the methanol. The presence of poly(2-methyloxazoline) in the graft product was confirmed by an infrared spectroscopy. The grafting efficiency was 12 percent and the poly(2-methyloxazoline) content of graft was 13 percent. The monomer conversion was 47 percent.

EXAMPLE V

PVC BACKBONE — SOLUTION POLYMERIZATION

Fifteen grams of PVC (F.P.C. 9300) was dissolved in 100 milliliters of 2-methyloxazoline and 100 milliliters of DMF. Two crystals of KI were also added to this solution and the mixture was stirred continuously in a sealed bottle at 80° C for 160 hours. A graft product was then precipitated in excess methanol, filtered and dried at 60° C in a vacuum oven. Then, 19.2 grams of a graft copolymer was obtained containing 22 percent of poly(2-methyloxazoline). Homo poly(2-methyloxazoline), which was recovered from the methanol solution, was 29.4 percent. Hence, grafting efficiency was 12.4 percent and monomer conversion was 33.6 percent.

EXAMPLE VI

NEOPRENE BACKBONE — BULK POLYMERIZATION

Fifteen grams of Neoprene G-18 (a polychloroprene) manufactured by DuPont was dissolved in 200 milliliters of 2-methyloxazoline and 5 milliliters of DMF containing 2 crystals of KI dissolved, were added to it. The reaction was continued for 168 hours at 80° C. A graft product was precipitated in excess methanol and oven filtered and dried. The amount of graft obtained was 38.7 grams, containing 61.2 percent of poly(2-methyoxazoline). The homo poly(2-methyloxazoline) recovered from the methanol solution was 4.6 grams. Hence, grafting efficiency was 83.7 percent and the monomer conversion was 14.2 percent. The graft polymer was molded at 275° F and gave a tough, yet flexible, sheet.

EXAMPLE VII

NEOPRENE BACKBONE — BULK POLYMERIZATION

Fifteen grams of Neoprene G-18 was dissolved in 200 milliliters of 2-methyloxazoline and 5 milliliters of $AgSO_3CF_3$ solution (0.13 moles in THF) was added. The mixture was stirred in a sealed bottle for 80 hours at 80° C. The graft product was precipitated, filtered and dried and was 40.0 grams. The poly(2-methyloxazoline) content of graft was 62.5 percent.

EXAMPLE VIII

POLYBUTADIENE BACKBONE — BULK POLYMERIZATION

To 9.6 grams of chlorinated (0.4 weight percent Cl) polybutadiene was added 177 grams of 2-methyloxazoline. The bottle was placed in an 80° bath overnight to dissolve the chlorinated polybutadiene. The bottle was then removed from the bath, cooled, and 18.0 milliliters of a KI solution (0.8 grams of KI and 40 millimeters of DMF) was added and the bottle placed in the 80° bath for an additional 72 hours. The bottle was removed from the bath and the contents thereof were coagulated in a solution of methyl alcohol, diethylether, and an antioxidant. The amount of the methyloxazoline incorporated into the copolymer was 18.6 percent by weight and the grafting efficiency was 27 percent. The dilute solution viscosity (DSV) in trichloromethane was 2.74. A gel content of 0 was obtained and the percent of 1,2-units was 13.2 percent. The material was cast from chloroform in a film and gave a tensile strength of 505 psi 3.48 mega pascales. The elongation at break was 680 percent.

EXAMPLE IX

POLYBUTADIENE BACKBONE — BULK POLYMERIZATION

A 0.13 mole solution of KI in DMF and a 0.13 mole solution of $AgSO_3CF_3$, silver triflate, was prepared and used as coinitiators for the grafting of 2-methyloxazoline onto allylic chlorinated polybutadiene polymers (percent Cl = 0.46 percent, $M_n$ = 113,900, MWD = 1.39, and vinyl content = 10 percent). Polymerization was effected in beverage bottles and placed in an 80° C thermostatic bath for 63.2 hours.

| Poly-butadiene (grams) | KI (mm) | $AgSO_3CF_3$ (mm) | Yield % Copolymer | % 2-methyloxazoline (by NMR) in copolymer |
|---|---|---|---|---|
| 15 | 1.3 | — | 22.4 | 50.9 |
| 15 | — | 1.3 | 32.1 | 70.1 |

Thus, the use of $AgSO_3CF_3$ as a coinitiator, surprisingly, gives much higher yields of copolymer and higher amounts of oxazoline in the copolymer than the use of KI as the coinitiator.

EXAMPLE X

POLYBUTADIENE BACKBONE — SOLUTION POLYMERIZATION

Into a 28 oz. bottle was added 213 grams of a 12.7 percent solution of chlorinated polybutadiene (0.24 percent Cl). Then, 87 grams of toluene and 150 grams of DMF along with 50 grams of 2-methyloxazoline and 1.5 grams of KI were added. The bottle was placed in an 80° C bath for 120 hours. The contents of the bottle were then coagulated in methyl alcohol. A grafting efficiency of 32.8 percent was obtained along with an inherent viscosity (DSV) in trichloromethane of 1.83. No gel was obtained.

In a similar manner to the bove examples, further bulk and solution polymerizations were conducted. The reaction conditions as well as the percent conversion and the grafting efficiency are set forth in Table II.

TABLE II (BUTADIENE GRAFTING) POLYMERIZATION OF 2-METHYLOXAZOLINE

| INITIATOR | KI, CO-CATALYST | SOLVENT | POLYMERIZATION TEMPERATURE, °C | POLYMERIZATION TIME, HOURS | CONVERSION % | EFFICIENCY % |
|---|---|---|---|---|---|---|
| CPBD | No | DMF/Tol. | 80 | 239 | nil | nil |
| CPBD | Yes | DMF/Tol. | 80 | 235 | 46.5 | 89.0 |
| CPBD | Yes | DMF/Tol. | 132 | 44.0 | 100 | 5.90 |
| CPBD | No | $CH_2Cl_2$ | 80 | 237 | 64.9 | 35.1 |
| CPBD | No | $CH_2Cl_2$ | 80 | 91 | 23.9 | 53.0 |
| CPBD | No | DMF/$CH_2CH_2$ | 80 | 237 | 85.5 | 1.7 |
| CPBD | Yes | Anisole/Tol. | 80 | 164 | 5.0 | 90.0 |
| CPBD | Yes | Bulk | 80 | 120 | 13.8 | 79.5 |
| CPBD | Yes | Bulk | 80 | 145 | 15.3 | 82.9 |

CPBD = allyl chlorinated polybutadiene

As apparent from Table II, high conversion of the oxazoline monomer can be obtained. Additionally, graft copolymers had high grafting efficiencies especially in the bulk reaction systems.

Various samples similar to, and in some cases identical to, those in Table II were subjected to physical testing and the results thereof are set forth in Table III.

TABLE III

| | NORMAL STRESS-STRAIN PROPERTIES | | | |
|---|---|---|---|---|
| Sample No. | % Methyl-oxazoline in Copolymer | Approximate % Unreacted Chlorine | Tensile Strength, MPa (psi) | Elongation % |
| A | 12.5 | 38 | 1.7 (280) | >1,000 |
| B | 16.7 | 31 | 4.0 (575) | >1,250 |
| C | 28.5 | 52 | 1.7 (270) | >1,150 |
| D | 43.3 | 87 | 6.0 (875) | 430 |

As apparent from Table III, fairly good tensile strengths were obtained along with good elongation at break.

EXAMPLE XI

SBR BACKBONE — BULK POLYMERIZATION

To a 28 ounce bottle was added 9.6 grams of allylic chlorinated solution SBR (Firestone Stereon 702)(1.16 percent chlorine) with 177 grams of 2-methyloxazoline monomer and 18 milliliters of KI solution (0.8 grams KI in 40.0 milliliters of DMF) as a coinitiator. The bottle was placed in a thermostatic bath at 80° C for 49 hours. The copolymer was isolated by coagulation in methanol containing an antixodant. The resulting copolymer showed a Tg at −75° C corresponding to the SBR backbone and a Tm at 153°-157° corresponding to the poly(methyloxazoline) graft (by DTA analysis).

While in accordance with the patent statutes, the invention has been described in detail, it is to be understood that any modifications and variations thereof may be made without departing from the spirit of the invention; the invention being measured by the appended claims.

What is claimed is:

1. A graft copolymer composition, comprising;
   the reaction product of a poly(vinyl chloride) backbone polymer having allylic chloride groups therein and monomers forming a pendant graft polymer,
   said monomers having the formula

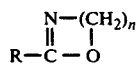

wherein R is an alkyl group having from 1 to 15 carbon atoms, a cycloalkyl group having from 4 to 15 carbon atoms, an aryl group having from 6 to 15 carbon atoms, combinations thereof, or hydrogen, and wherein n is 2 or 3,
   the amount by weight of said pendant graft polymer ranging from about 0.5 percent to about 90 percent based upon the total weight of said graft copolymer, the number average molecular weight of said poly(vinyl chloride) backbone ranging from about 500 to about 500,000,
   the amount of said allylic chloride groups in said backbone polymer ranging from about 0.1 percent to about 5 percent by weight,
   said graft polymer substituted for said chlorine atom of said allylic chloride group of said backbone polymer.

2. A graft copolymer composition according to claim 1, wherein said pendant graft polymers are made from monomers selected from the class consisting of 2-methyloxazoline, 2-methyloxazine, and combinations thereof.

3. A graft copolymer composition according to claim 2, wherein the amount of allylic chloride groups in said backbone polymer ranges from about 0.3 percent about 3.0 percent by weight, wherein the number average molecular weight of said poly(vinyl chloride) backbone polymer ranges from about 20,000 to about 150,000, and wherein the amount by weight of said pendant polymer to the total weight of said graft copolymer ranges from about 2 percent to about 70 percent.

4. A process for preparing graft copolymers, comprising the steps of;
   providing a poly(vinyl chloride) backbone polymer having allylic chloride groups therein, said poly(vinyl chloride) polymer having a number average molecular weight of from about 500 to about 500,000,
   the amount of said allylic chloride groups in said backbone polymer ranging from about 0.1 percent to about 5 percent by weight,
   adding monomers for forming pendant polymers on said backbone polymer, said monomers having the formula

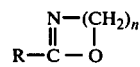

wherein R is an alkyl group having from 1 to 15 carbon atoms, a cycloalky group having from 4 to 15 carbon atoms, an aryl group having from 6 to 15 carbon atoms, combinations thereof, or hydrogen, and wherein n is 2 to 3,
   adding from about 0.2 to about 10.0 millimoles of a metal salt coinitiator, said metal of said coinitiator selected from the class consisting of metals of Group 1a and Group 1b of the Periodic Table, said anion portion of said metal salt coinitiator is selected from the class consisting of $CF_3SO_3^-$, $PF_6^-$, $Cl_4^-$, $BF_4^-$, $SbCl_6^-$, $AsF_6^-$, $I^-$, and $Br^-$, and
   heating to produce a graft copolymer wherein said monomers are polymerized and form pendant polymers, the amount by weight of said pendant graft polymer ranging from about 0.5 percent to about 90 percent based upon the total weight of said graft copolymer, said pendant polymers substituted for said chlorine atom of said allylic chloride group of said backbone polymer, said heating temperature ranging from about 50° C to about 150° C.

5. A proces for preparing a graft copolymer according to claim 4, wherein the amount of said pendant polymer of the total weight of said graft copolymer ranges from about 2.0 percent to about 70 percent.

6. A process for the preparation of a graft copolymer according to claim 5, wherein said monomers are selected from the class consisting of 2-methyloxazoline, 2-methyloxazine, and combinations thereof, and
   wherein the amount of said allylic chloride groups in said backbone polymer ranges from about 0.3 to about 3 percent by weight.

7. A process for the preparation of a graft copolymer according to claim 6, wherein said number average molecular weight of said poly(vinyl chloride) backbone polymer ranges from about 20,000 to about 150,000, wherein said heating temperature to produce the graft copolymer ranges from about 80° C to about 150° C, and wherein the amount of said coinitiator ranges from about 0.4 millimoles to about 3 millimoles.

8. A process for the preparation of a graft copolymer comprising the steps of;

providing a poly(vinyl chloride) backbone polymer having allylic chloride groups therein, said poly(vinyl chloride) polymer having a number average molecular weight of from about 500 to about 500,000, the amount of said allylic chloride groups in said backbone polymer ranging from about 0.1 percent to about 5 percent by weight, adding monomers for forming pendant polymers on said backbone polymer, said monomers having the formula

wherein R is an alkyl group having from 1 to 15 carbon atoms, a cycloalkyl group having from 4 to 15 carbon atoms, an aryl group having from 6 to 15 carbon atoms, combinations thereof, or hydrogen, and wherein n is 2 or 3, adding from 0.2 to about 10.0 millimoles of a metal salt coinitiator, said metal salt coinitiator is $AgSO_3CF_3$, and heating to produce a graft copolymer wherein said monomers are polymerized and form pendant polymers, the amount by weight of said pendant graft polymer ranging from about 0.5 percent to about 90 percent based upon the total weight of said graft copolymer, said pendant polymers substituted for said chlorine atom of said allylic chloride group of said backbone polymer, said heating temperature ranging from about 50° C to about 150° C.

9. A process for the preparation of a graft copolymer according to claim 7, wherein said polymerization is conducted in bulk or made in a solvent.

10. A process for the preparation of a graft copolymer according to claim 8, wherein the amount by weight of said pendant polymer to the total weight of said graft copolymer ranges from about 2 percent to about 70 percent, wherein said monomers are selected from the class consisting of 2-methyloxazoline, 2-methyloxazine, and combinations thereof, wherein the amount of said allylic chloride groups in said backbone polymer ranges from about 0.3 to about 3 percent by weight, wherein the number average molecular weight of said poly(vinyl chloride) backbone polymer ranges from about 20,000 to about 150,000, wherein said heating temperature to produce the graft copolymer ranges from about 80° C to about 150° C, and wherein the amount of said coinitiator ranges from about 0.4 millimoles to about 3 millimoles.

11. A graft copolymer composition, comprising, the reaction product of a poly(vinyl chloride) backbone polymer having allylic chloride groups therein and monomers forming a pendant graft copolymer, said reaction product made by forming a reaction mixture, said reaction mixture containing said poly(vinyl chloride) backbone polymer having allylic chloride groups therein and said monomers forming a pendant graft copolymer, the amount of said allylic chloride groups in said backbone polymer ranging from about 0.1 percent to about 5 percent by weight, said poly(vinyl chloride) backbone polymer having a number average molecular weight of from about 500 to about 500,000, said monomers forming said pendant graft polymer having the formula

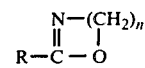

wherein R is an alkyl group having from 1 to 15 carbon atoms, a cycloalkyl group having from 4 to 15 carbon atoms, an aryl group having from 6 to 15 carbon atoms, combination thereof, or hydrogen, and wherein n is 2 or 3, adding from about 0.2 to about 10.0 millimoles of a metal salt coinitiator, said metal of said coninitiator selected from the class consisting of metals of Group 1a and Group 1b of the Periodic Table, said anion portion of said metal salt coinitiator is selected from the class consisting of $CF_3SO_3^-$, $PF_6^-$, $ClO_4^-$, $BF_4^-$, $SbCl_6^-$, $AsF_6^-$, $I^-$, and $Br^-$, and heating said reaction mixtue to produce a graft copolymer wherein said monomers are polymerized and form pendant polymers, said pendant polymers substituted for said chlorine atom of said allylic chloride group of said backbone polymer, said heating temperature ranging from about 50° C to about 150° C, and wherein the amount by weight of said pendant graft polymer formed ranges from about 0.5 percent to about 90 percent based upon the total weight of said graft copolymer.

12. A graft copolymer composition according to claim 11, wherein the amount of said pendant graft polymer ranges from about 2 to about 70 percent.

13. A graft copolymer composition according to claim 12, wherein said monomers are selected from the class consisting of 2-methyloxazoline, 2-methyloxazine, and wherein the amount of said allylic chloride groups in said backbone polymer ranges from about 0.3 to about 3 percent by weight.

14. A graft copolymer composition according to claim 13, wherein said number average molecular weight of said elastomer backbone polymer ranges from about 20,000 to about 150,000, wherein said heating temperature to produce,th graft copolymer ranges from about 80° C to about 150° C, and wherein the amount of said coinitiator ranges from about 0.4 millimoles to about 3 millimoles.

15. A graft copolymer composition comprising, the reaction product of a poly(vinyl chloride) backbone polymer having allylic chloride groups therein and monomers forming a pendant graft copolymer, said reaction product made by forming a reaction mixture, said reaction mixture containing said poly(vinyl chloride) backbone polymer having allylic chloride groups therein and said monomers forming a pendant graft copolymer, the amount of said allylic chloride groups in said backbone polymer ranging from about 0.1 percent to about 5 percent by weight, said poly(vinyl chloride) backbone polymer having a number average molecular weight of from about 500 to about 500,000, said monomers forming said pendant graft polymer having the formula

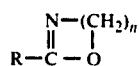

wherein R is an alkyl group having from 1 to 15 carbon atoms, a cycloalkyl group having from 4 to 15 carbon atoms, an aryl group having from 6 to 15 carbon atoms, combinations thereof, or hydrogen, and wherein n is 2 or 3, adding from about 0.2 to about 10.0 millimoles of a metal salt coinitiator, said metal salt coinitiator is $AgSO_3CF_3$, and heating said reaction mixture to produce a graft copolymer wherein said monomers are polymerized and form pendant polymers, said pendant polymers substituted for said chlorine atom of said allylic chloride group of said backbone polymer, said heating temperature ranging from about 50° C to about 150° C, and wherein the amount by weight of said pendant graft polymer formed ranges from about 0.5 percent to about 90 percent based upon the total weight of said graft copolymer.

16. A graft copolymer composition according to claim 14, wherein said polymerization is conducted in bulk or made in a solvent.

17. A graft copolymer composition according to claim 15, wherein the amount of said pendant graft polymer ranges from about 2.0 percent to about 70 percent, wherein said monomers are selected from the class consisting of 2-methyloxazoline, 2-methyloxazine, and combinations thereof, wherein the amount of said allylic chloride groups in said backbone polymer ranges from about 0.3 to about 3 percent by weight, wherein said number average molecular weight of said elastomer backbone polymer ranges from about 20,000 to about 150,000, wherein said heating temperature to produce said graft copolymer ranges from about 80° C to about 150° C, and wherein the amount of said coinitiator ranges from about 0.4 millimiles to about 3 millimoles.

* * * * *